United States Patent

Bump et al.

[15] 3,666,832

[45] May 30, 1972

[54] STABLE VINYL CHLORIDE INTERPOLYMER SYSTEMS

[72] Inventors: Charles K. Bump, Hampden; Frank J. Hahn, Wilbraham, both of Mass.

[73] Assignee: Monsanto Company, St. Louis, Mo.

[22] Filed: July 17, 1970

[21] Appl. No.: 55,963

Related U.S. Application Data

[63] Continuation-in-part of Ser. No. 714,774, Mar. 21, 1968, abandoned.

[52] U.S. Cl..........................260/853, 117/124 E, 117/132 A, 117/132 BF, 117/161 LN, 260/21, 260/32.8 N, 260/33.4 R, 260/33.6 UA, 260/39 R, 260/45.7 P, 260/78.5 CL
[51] Int. Cl.......................................C08q 37/32, C08f 45/56
[58] Field of Search...............260/853, 45.7 P, 45.9, 78.5 CL

[56] References Cited

UNITED STATES PATENTS

| | | |
|---|---|---|
| 3,260,705 | 7/1966 | Slocombe et al. ..............260/78.5 CL |
| 3,392,137 | 7/1968 | Slocombe......................260/78.5 CL |
| 2,458,639 | 1/1949 | Quarles..................................260/853 |
| 2,923,653 | 2/1960 | Matlin et al..........................260/853 |
| 2,607,754 | 8/1952 | Ellingboe et al.......................260/853 |
| 3,260,704 | 1/1966 | Slocombe...............................260/853 |
| 2,337,424 | 12/1943 | Stoner et al..........................260/45.7 |
| 2,516,980 | 8/1950 | Gray et al. ...........................260/45.7 |
| 2,597,987 | 5/1952 | Harding................................260/45.7 |
| 3,156,667 | 11/1964 | Martins................................260/45.7 |

*Primary Examiner*—John C. Bleutge
*Attorney*—John W. Klooster, James C. Logomasini, Richard W. Sternberg and Neal E. Willis

[57] ABSTRACT

Disclosed herein are compositions of etherified aminoplast resins and copolymers of vinyl chloride and hydroxy containing fumarate diesters cured with phosphoric acid compounds. These compositions when coated on substrates, display excellent strength characteristics and light stability.

9 Claims, No Drawings

STABLE VINYL CHLORIDE INTERPOLYMER SYSTEMS

RELATED APPLICATION

This application is a continuation-in-part of our copending application, U.S. Ser. No. 714,774, filed Mar. 21, 1968, now abandoned.

BACKGROUND OF THE INVENTION

The prior art appreciates that hydroxylated vinyl chloride interpolymers can be admixed with aminoplast resins to provide compositions which, upon curing, result in coatings of excellent hardness. It has been observed, however, that upon extended exposure to light, particularly ultra-violet light, films and coatings of these cured compositions tend to discolor, turn yellow or brown depending upon the duration and severity of exposure. It has now been discovered that a particular combination of hydroxylated vinyl chloride polymer and aminoplast resins can be used to produce coatings which not only have excellent hardness characteristics, but which also display excellent light stability characteristics, particularly when such compositions are cured in the presence of a phosphoric acid compound.

SUMMARY OF THE INVENTION

This invention relates to compositions comprising etherified aminoplast resins and copolymers of vinyl chloride with fumaric acid diesters. These compositions, particularly when cured with phosphoric acid compounds, display excellent strength characteristics and light stability characteristics.

The copolymers of vinyl chloride and fumaric acid diesters employed in the present invention are known generally to the prior art. See, for example, Slocombe U.S. Pat. No. 3,260,705 and Slocombe, U.S. Pat. No. 3,392,137. The fumaric acid diester used is one in which one esterifying group is an hydroxy (oxa) hydrocarbyl group and the other esterifying group is selected from the group consisting of alkyl, cycloalkyl, aryl, aralkyl and alkaryl, and about 2 to about 75 percent by weight of the polymer is from the said diester.

Such copolymers may be modified through the addition of minor amounts of other monomers in polymerization so as to achieve a controlled or desired molecular weight and to contribute to the stability of the resulting polymer. A particularly preferred added monomer is isobutylene which, if present, can range in quantity from about 0.5 to 3 mols per mol of ester monomer.

In general, vinyl chloride copolymers used in this invention contain from about 45 to 90 percent vinyl chloride, from about 8 to 53 percent fumaric acid diester and from about 2 to 20 percent isobutylene (if present), the percentages being by weight. Typical molecular weights range from about 1,000 to 25,000 and more particularly from about 1,000 to 10,000. Relatively low molecular weights, often less than 5,000, are preferred in solution and coating applications. For solution applications, copolymers having a viscosity in the range of from about U to X on the Gardner Holt viscosity scale measured as a 50 percent solids solution in a 50:50 weight mixture of methylisobutyl ketone;toluene are particularly suitable.

The etherified aminoplast formaldehyde condensates employed in this invention can utilize, as the aminoplast, melamine, urea, a guanamine such as benzoguanamine, or the like. The etherification is accomplished through the use of a lower alkanol (one containing less than six carbon atoms per molecule) by post etherifying a preformed aminoplast formaldehyde condensate, all as those skilled in the art fully appreciate. Preferred etherifying lower alkanols are methanol and butanol. Such materials and methods for their preparation have long been known to the art. See "Technology of Paint, Varnishes & Lacquers," Martens (1968).

When the vinyl chloride copolymers are admixed with the etherified aminoplasts, a thermosettable resin mixture results. Particularly when such a mixture is exposed to an elevated temperature, it has been found that the reaction between these two classes of polymers is catalyzed advantageously by the presence of a phosphoric acid compound selected from the group consisting of phosphoric acid, alkyl esters of phosphoric acid, salts of phosphoric acid with amines or quaternary ammonium compounds and mixtures thereof.

Suitable such compounds include phosphoric acid (preferred), alkyl esters of phosphoric acid, and salts of phosphoric acid with amines and quaternary ammonium compounds. It will be understood that under certain conditions which the improved compositions of this invention may be expected to encounter, e.g., heat, moisture, etc., other oxy-acids of phosphorus or phosphorus oxides may be expected to generate the preferred stabilizers in situ. Such compounds are thus also within the scope of this invention. These compounds include, for example, hypophosphorous acid ($H_3PO_2$), metaphosphorous acid ($HPO_2$), orthophosphorous acid ($H_3PO_3$), pyrophosphorous acid ($H_4P_2O_5$), hypophosphoric acid ($H_4P_2O_6$), metaphosphoric acid ($HPO_3$), triphosphoric acid ($H_5P_3O_{10}$), pyrophosphoric acid ($H_4P_2O_7$), phosphorus (111) oxide ($P_4O_6$), phosphorus pentoxide ($P_4O_{10}$), phosphorus tetroxide ($P_2O_4$), etc.

As pointed out above, alkyl esters of phosphoric acid formed by interaction with alkyl alcohols such as methanol, ethanol, n-propanol, isopropanol, n-butanol, isobutanol, secondary butanol, tertiary butanol, etc. are also within the scope of this invention. These alcohols may react with one or more of the reactive hydrogens of the phosphoric acid to form the mono-, di- or tri-, alkyl esters. Salts of $H_3PO_4$ may be formed by reaction with primary, secondary, tertiary, alkyl, aryl and aralkyl amines such as, for example, methylamine, diethylamine, tripropylamine, aniline, metatoluidine, 2,3-xylidine, mesidine, N-ethyl-N-methyl-propylamine, N,N-dimethyl butylamine, N-propyl-allylamine, N-allyl-propylamine, N-ethyl-dipropylamine, N-phenyl-benzylamine, N-cyclohexylheptylamine, N,N-diethylbutylamine, N,N-diethylpropylamine, 1-naphthylamine, 1-fluroenamine, 2-furanamine, 2p-dioxanamine, 3-gamma-pyranylamine, 2-pyrenamine, 3-biphenylamine, xenylamine, benzylamine, phenethylamine, furfurylamine, 1-naphthalene-methylamine, 1-indanethylamine; polyamines such as putrescine, cadaverine, ethylenediamine, o-phenylenediamine, 1,4-anthradiamine, 1,2-propanediamine, 1,3-propanediamine, 1,2-butanediamine, 1,4-naphthalenediamine, 1,2,3-benzenetriamine, 3,3'-biphenyldiamine, 3,4-biphenyldiamine, diethylenetriamine, triethylenetetramine; nitrogen-containing heterocycles such as 2-aminopyrrole, 2,6-diaminopyridine, 2,4-diamino-5-(aminomethyl)-pyrimidine, 1-aminoacridine, 2,5-diamino-1,3,4-thiadiazole, etc. Quaternary ammonium compounds may be used to form salts with the phosphoric acid; for example, betaine and esters of betaine, trimethylamine hydrobromide, aniline trichloroacetate, etc.

In the mixed resin compositions of this invention, it is preferred to employ from about 60 to 95 parts by weight of copolymer of vinyl chloride and fumaric acid diester, and, inversely, from about 40 to 5 weight percent of etherified aminoplast formaldehyde condensate. When catalyzing the cure of the mixed resin composition with a phosphoric acid compound, one employs for each 100 parts by weight of such mixed resin composition from about 0.001 to 6 parts by weight of phosphoric acid compound. When one employs a solution of a composition of this invention, as in a coating operation, typically the amount of total solids dissolved in organic solution ranges from about 10 to 50 weight percent with from about 30 to 45 weight percent being commonly employed. More dilute solutions are employed in spraying operations and more concentrated solutions are employed in casting or roller coating operations.

The compositions of this invention are suitable for use as laminating resins and as coating resins. When used as coating resins, the compositions are particularly useful for use as metal coatings in coating, for example, sheet metal (i.e. coil coating) and the like. Use applications include automotive topcoats, appliances, office furniture and the like. Typical use procedures when using compositions of this invention in coating applications involve the use of the compounds in solution form using common organic solvents as those well known in the coating art will appreciate. The solutions may be pigmented or contain other additives as desired. Solutions are applied by conventional techniques including spraying, dipping, painting, etc. The resulting coating is dried and exposed to temperatures ranging from about 180° to 325° F. ranging, inversely, from those for, typically about 60 to 10 minutes. The product baked coatings display excellent hardness characteristics as shown by pencil hardness tests, reverse impact tests, etc. Particularly when such product baked coatings are prepared using phosphoric acid compounds as described above, the product baked coatings display excellent and unexpected light stability.

EMBODIMENTS

The following examples are presented in illustration of this invention and are not intended as limitations thereof. Where "parts" are mentioned, parts by weight are intended unless otherwise indicated.

EXAMPLE 1

PART A

A 25.4 percent solution is prepared by mixing 29.9 parts of 85 percent aqueous phosphoric acid with 70.1 parts of n-butanol.

PART B

An 8.4 percent solution is prepared by mixing 33.1 parts of the solution of Part A with 66.7 parts of butanol.

PART C

A 0.5 percent solution is prepared by mixing 6.0 parts of the solution of Part B with 94.0 parts of butanol.

PART D

The following master batch is prepared: 290 Parts of a copolymer containing 75 parts by weight of vinyl chloride and 25 parts by weight of 2-hydroxyethyl ethyl fumarate, 33.3 parts of a 60 percent solids solution of a butylated urea-formaldehyde resin, 95 parts of n-butanol, 170 parts of methyl isobutyl ketone, 170 parts of xylene and 5 parts of a commercially available epoxidized soybean oil. The butylated urea-formaldehyde resin is available commercially from the Monsanto Company under the trade designation U-920. This resin is a 60 percent solids solution in butanol and xylol (3:1 weight ratio) having an acid number less than 2, a viscosity (Gardner Holt Bubble tube standard at 25° C.) of U-X, and ASTM solvent tolerance between 2.0 and 3.0 ml/gm resin (ASTM-D-1 198-55).

EXAMPLE 2

0.1 ml. of the phosphoric acid solution of Example 1, Part C, is added to 75 grams of the solution of Example 1, Part D. A film of the resulting solution is cast upon a steel test panel and baked at 250° F. for 30 minutes. The resulting film has a pencil hardness of 5H. The coated panel is then subjected to a reverse impact test and no failures are found at impacts of 20, 40, and 80 inch pounds.

EXAMPLE 3

1 ml. of the phosphoric acid solution of Example 1, Part A, is added to 75 grams of the solution of Example 1, Part D. A test panel is prepared using this solution in the manner outlined in Example 2. Again the pencil hardness of the baked coating is found to be 5H and no failures are observed at 20, 40, or 80 inch pounds reverse impact.

EXAMPLE 4

As a control, a sample containing no phosphoric acid is prepared using 75 grams of the solution of Example 1, Part D. Following the same procedure as in the previous two examples, pencil hardness is again found to be 5H and no failures are observed in the described reverse impact test. Thus, Examples 2, 3, and 4 demonstrate that the addition of phosphoric acid to these resinous coating systems has no adverse effect on the strength or hardness of the final coating. This is particularly surprising in the light of the known tendency of vinyl chloride resins to degrade in the presence of mineral acids.

EXAMPLE 5

Coated mild steel test panels prepared as in Examples, 2, 3, and 4 are subjected to 509 hours of exposure to ultra-violet light in a Weather-O-Meter. At the end of the exposure, the color of the control (Example 4) is a continuous yellowish-brown. The color of the specimen coated with the composition of Example 2 is a continuous yellow, the color being lighter and improved over that of the control. Finally, there is essentially no color at all in the film prepared according to Example 3. This example demonstrates that the addition of phosphoric acid to a resinous system based upon a copolymer of vinyl chloride and a compound containing a primary alcohol group substantially improves the resistance to ultra-violet light and, as seen above in Example 4, does not adversely affect other properties. Further, the protection afforded by the phosphoric acid addition is directly proportional to the amount of phosphoric acid added.

It has been found, however, that there is an optimum concentration of $H_3PO_4$ in the range of 0.0065 part – 0.33 part per 100 parts of the vinyl chloride interpolymer. Lower concentrations than this have very little catalytic effect on the cure rate of the vinyl chloride copolymer with any added thermosetting resin. Higher concentrations diminish physical properties such as resistance to impact.

EXAMPLE 6

PART A

28 Parts of a 75/25 copolymer of vinyl chloride/2-hydroxyethyl ethyl fumarate is dissolved in a mixture of 9 parts of butanol, 14 parts of methyl isobutyl ketone and 20 parts of xylene. To this is added 50 parts of titanium dioxide. The resulting mixture is ball milled. A second solution is prepared containing 28 parts of the vinyl chloride-fumarate copolymer, 7 parts of a butylated urea-formaldehyde resin, 1 part of a commercially available epoxidized soybean oil, 9 parts of butanol, 20 parts of methyl isobutyl ketone and 13 parts of xylene. The two mixtures are combined. The urea-formaldehyde resin used here is like that employed above in Example 1. The epoxidized soybean oil is used as a heat stabilizer here.

PART B

A 10 percent solution of the triethylamine salt of phosphoric acid is prepared by diluting 10 grams of an 8.41 percent solution of phosphoric acid in butanol with 6.5 grams of butanol. To this is added 0.867 grams of triethylamine.

PART C 0.344 Ml. of the solution of Part B is added to 20 grams of the mixture of Part A. The resulting coating composition has a Ford Cup viscosity at 25° C. of 117 seconds. 9 Mil. wet films are cast on mild steel test panels and baked for 30 minutes at 250° F. The resulting baked films have a pencil hardness of 4H and no failures are observed under impacts of 28 inch pounds and 40 inch pounds in the reverse impact test. Under an impact of 80 inch pounds occasional cracks, usually unconnected, are observed. Adhesion of the film to substrate under such impact is good, however. Resistance to light exposure is also good.

EXAMPLE 7

A 10 percent solution of the 2-methyl-2-aminopropanol salt of phosphoric acid is prepared by adding 1.79 parts of molten 2-methyl-2-aminopropanol of 1.15 parts of 85 percent phosphoric acid dissolved in 24.66 parts of water, 0.468 milliliter of this solution is then added to 20 grams of the resin mixture prepared in Example 8, Part A. Steel test panels are coated as in Example 8. The hardness of the film is found to be 3H and no failures are observed under a reverse impact of 40 inch pounds. Under a reverse impact of 80 inch pounds. occasional cracks are observed but such cracks are usually not connected. Adhesion of the film to the metal substrate remains good. Again, there is good resistance to exposure to light.

EXAMPLE 8

PART A

To 9 parts of n-butanol, 17.5 parts of methyl isobutyl ketone and 17.5 parts of xylene are added to 25.5 parts of the vinyl chloride copolymer of Example 1, Part D, 0.5 part of the epoxidized soybean oil of Example 1, Part D and 5 parts of a commercially available methylated methylol melamine. The methylol melamine resin (melamine-formaldehyde resin) used here is available commercially from the Monsanto Company under the trade designation "Resimene 740" (trademark) as a 87–90 percent solids solution in isopropanol having an acid number of less than 1, a viscosity (Gardner Holt Bubble tube standard at 25° C.) of W-$Z_2$, and ASTM solvent tolerance of about 1.0 to 1.5 ml/gm.

PART B

To 25 parts of the mixture of Part A is added 0.11 part of a 10 percent solution of phosphoric acid in butanol. A 9 mil thick wet film of the resulting mixture is applied to a glass plate. The film is air dried and then baked for 30 minutes at 250° F. The percent transmission is measured in a spectrophotometer at 420 millimicrons. The film and glass have a per cent transmission of 88.2 The coated glass is then subjected to the effects of high-intensity ultra-violet light for 983 hours. At the end of that time, the percent transmission is again measured and found to be 81.3.

PART C

Part B is repeated except that the phosphoric acid is omitted. Initially, the coated glass is found to have a per cent transmission of 88.1. After 983 hours the percent transmission is 60.6.

This example demonstrates that the addition of phosphoric acid is beneficial for systems containing melamine resins as well as systems containing urea resins.

EXAMPLE 9

PART A

Example 8, Part A is repeated except that a partially hydrolyzed copolymer of vinyl chloride and vinyl acetate is substituted for the vinyl chloride-fumarate copolymer used therein. An additional 12.5 parts of methyl isobutyl ketone and 12.5 parts of xylene are also added. It will be noted that the vinyl chloride interpolymer being used here is actually a terpolymer of vinyl chloride, vinyl acetate and vinyl alcohol. It will be noted further that vinyl alcohol is a secondary alcohol and not a primary alcohol.

PART B

Example 8, Part B is repeated using the mixture of Part A of the present example. The coated glass is found to have an initial percent transmission of 88.2. After 983 hours exposure to the high-intensity ultra-violet light the percent transmission has fallen to 0.5.

PART C

Example 8, Part C is repeated using the mixture of Example 9, Part A. A coated glass is found to have an initial percent transmission of 87.7. After 983 hours exposure to the high-intensity ultraviolet light the coated glass has a per cent transmission of 1.4.

This example demonstrates that the addition of phosphoric acid has no effect upon a system wherein the vinyl chloride interpolymer contains no primary alcohol groups.

EXAMPLE 10

The procedure of Example 1 is repeated except that in place of the butylated urea-formaldehyde resin, there is employed 15 parts of a butylated benzoguanamine resin. This resin is available commercially under the trade designation "Uformite MX–61"(a product of the Rohm & Haas Company) and has a solids content of about 65.7 percent in a solvent comprising 18 percent xylol and 11 percent butanol. It has a viscosity of G+ and a solvent tolerance of about 3.81 milliliters per gram. The alcohol used to etherify this benzoguanamine is n-butanol.

EXAMPLE 11

0.1 Ml. of the phosphoric acid solution of Example 10 is added to 75 grams of the solution of Example 10. A film of the resulting solution is cast upon a steel test panel and baked at 250° F. for 30 minutes. The resulting film has a pencil hardness of 5H. The coated panel is then subjected to a reverse impact test and no failures are found at impacts of 20, 40, and 80 inch pounds. The film has surprising light stability.

It is obvious that many variations may be made in the products and processes herein set forth without departing from the spirit and scope of this invention.

It is a surprising feature of the present invention that, when many conventional light stabilizers of the type normally used with vinyl chloride polymers and copolymers are composited with the vinyl chloride copolymer, the etherified aminoplast formaldehyde resin, and the phosphoric acid compound before cure is effectuated, a synergistically effective light stabilization in the resulting cured system is observed. Apparently (and there is no wish to be bound by theory) the phosphoric acid compound synergistically coacts with the other light stabilizer present to render the resulting composition more light stable than would be expected from the additive effect of using merely the phosphoric acid and the conventional light stabilizer together. Thus, this synergistic effect is noted with such commercial light stabilizers as Tinuvin P, Uvinul N–35 and Cyasorb P–1988 and the like. For example, when in the mixture of Part B of Example 8 there is added two parts of Tinuvin P and the resulting mixture is then applied, dried, and baked as there described, the per cent transmission as measured in a Spectrophotometer at 420 millimicrons is found to be even better than the per cent of light transmission found with phosphoric acid alone after a similar exposure to high intensity ultra-violet light.

Preferred fumarate esters for use in making the vinyl chloride copolymers are as characterized in claim 2 of U.S. Pat. No. 3,392,137.

What is claimed is:

1. A cured coating composition comprising:
    A. from 60 to 95 parts by weight of a copolymer of vinyl chloride with a fumarate diester in which one esterifying group is an hydroxy (oxa) hydrocarbyl group and the other esterifying group is selected from the group consisting of alkyl, cycloalkyl, aryl, aralkyl and alkaryl, and the said fumarate diester is from 2 to 75 percent by weight of the copolymer;
    B. inversely from 40 to 5 parts by weight of an etherified aminoplast formaldehyde condensate wherein the aminoplast is selected from the group consisting of melamine, urea and a guanamine and wherein the etherification is accomplished by reacting said aminoplast formaldehyde condensate with a lower alkanol; and C. from 0.0065 part to 0.33 part by weight per 100 parts of vinyl chloride copolymer of a phosphoric acid compound selected from the group consisting of phosphoric acid, alkyl esters of phosphoric acid, and amine salts of phosphoric acid.

2. The composition of claim 1 wherein the phosphoric acid compound is phosphoric acid.

3. The composition of claim 1 wherein the etherified aminoplast formaldehyde condensate is a methylated methylol-melamino-formaldehyde condensation product.

4. The composition of claim 1 wherein the etherified aminoplast formaldehyde condensate is a butylated urea-formaldehyde condensation product.

5. The composition of claim 1 wherein the hydroxyfumarate is ethyl 2-hydroxyethyl fumarate.

6. The composition of claim 1 wherein the hydroxyfumarate is ethyl 2-hydroxyethyl fumarate present as 15 to 30 weight percent of the vinyl chloride copolymer.

7. The composition of claim 1 wherein cure is effected by baking at temperatures between 180° and 325° F. for times varying inversely from 60 to 10 minutes.

8. A cured coating composition comprising:

A. from 80 to 95 parts by weight of a copolymer of vinyl chloride and ethyl 2-hydroxyethyl fumarate wherein the vinyl chloride is 75 weight percent of the copolymer;

B. inversely 20 to 5 parts by weight of an etherified aminoplast formaldehyde condensate wherein the aminoplast is selected from the group consisting of melamine, urea and benzoguanamine and wherein the etherification is accomplished by reacting said aminoplast foamaldehyde condensate with a $C_1$ to $C_4$ alcohol; and C. from 0.0065 to 0.33 parts by weight per 100 parts of vinyl chloride copolymer of a phosphoric acid compound selected from the group consisting of phosphoric acid, alkyl esters of phosphoric acid and amine salts of phosphoric acid; wherein cure is effected at 250° F. for 30 minutes.

9. The composition of claim 8 wherein the phosphoric acid compound is phosphoric acid.

* * * * *